3,510,329
NEW SULFUR COMPOSITIONS
Donald J. Martin, Zurich, Switzerland, assignor to Stauffer Chemical Company, New York, N.Y., a corporation of Delaware
No Drawing. Filed Dec. 2, 1966, Ser. No. 598,637
Int. Cl. C09d 1/00; C08h 17/48; C07d 87/46
U.S. Cl. 106—287          5 Claims

ABSTRACT OF THE DISCLOSURE

Impact-resistant sulfur compositions suitable for marking roads which are prepared by reacting a polysulfide plasticizer of the formula:

$$R—S_x—R'$$

wherein R and R' are secondary amines to include aliphatic, alicyclic, aromatic and heterocyclic amines, and $x$ is an integer of from 2 to 10 inclusive; with elemental sulfur in a weight ratio of from 1 to 99 to 1 to 4.

---

Considerable research has been conducted on the utilization of sulfur compositions because of the inherent properties which such compositions exhibit. They are generally inexpensive and resistant to attack by acids, penetration by tree roots, as well as resistant to the action of lubricating oils or gasoline. Accordingly, such compositions have been found useful for jointing brick, sewer pipe, segmental tile, and sewer brick. Sulfur compositions have also found use as road marking materials because of their inherent strength, flexibility and resiliency. Despite the considerable market potential for a successful plasticized road marking composition, suitable plasticizers have been mainly limited to the alkylene tetrasulfides, and specifically polyethylene tetrasulfide. One of the primary defects found with the polyalkylene tetrasulfides, and particularly polyethylene tetrasulfide, is the limited resistance to damage by impact which considerably limits their use for various applications.

It is the primary object of this invention to provide new compositions of matter.

It is a further object to provide sulfur compositions which are resistant to impact and which are suitable for marking roads, highways, and other paved surfaces.

Other objects will be apparent from the description which follows.

The compositions provided by this invention are unusually resistant to cracking by impact and, accordingly, are especially well suited for marking compositions and other applications where the utilization of sulfur compositions has not heretofore been feasible because of such deficiencies.

The polysulfide plasticizers utilized in my invention can be represented by the following formula:

$$R—S_x—R'$$

wherein R and R' are secondary amines, and $x$ is an integer of from two to ten inclusive.

Examples of suitable secondary amines for the purposes of this invention include: aliphatic amines such as dimethyl amine, ethyl methyl amine, diethyl amine, diisopropyl amine, dibutyl amine, dipentyl amine, and didodecyl amine; alicyclic amines such as dicyclohexyl amine and dicyclopropyl amine; aromatic amines such as diphenyl amine, N-phenyl-1-naphthylamine, N-phenyl-2-naphthylamine, N-methylphenylamine, N-ethylphenylamine; and heterocyclic amines such as ethyleneimine, hexamethyleneimine, morpholine, piperidine, tetrahydroquinoline, tetrahydropyrrole, 1,2,3-dioxazole, p-isoxazine, and indole.

The above polysulfide plasticizers are prepared by methods well known to the art. For example, the desired amine can be reacted with a sulfur halide such as sulfur monochloride in a molar ratio of at least 2:1. An inert organic solvent is employed and the reaction is conducted in the presence of an alkaline material, such as sodium carbonate. The reaction is extremely exothermic. In order to avoid any loss of solvent, the reaction is preferably conducted at a temperature below about 30° C. If desired in lieu of a solvent an excess of amine can be employed which will also serve as the alkaline material and neutralize the hydrogen halide by-product. The reaction mixture is then filtered, washed with water several times and dried to recover the polysulfide product. The sulfur rank (i.e., the number of sulfur atoms in the molecule) can be increased if desired by heating the disulfide with elemental sulfur. It is preferred, however, to utilize the disulfides which generally impart greater impact resistance to the sulfur composition than the polysulfides of higher sulfur rank, and the disulfide plasticized sulfur compositions also generally have superior flow, adhesion and hardness properties. Polysulfides can be prepared wherein R and R' are different secondary amines but generally it will be more convenient to prepare compounds wherein both R and R' are the same.

To prepare the novel impact resistant sulfur compositions, the above polysulfides are reacted with elemental sulfur in a polysulfide-sulfur weight ratio of from 1:99 to 1:1 and preferably from about 5:95 to 1:4. It is another embodiment of this invention to utilize a small amount of an alkaline material (hereinafter intended to include any substance whose aqueous solution is characterized by having a pH greater than 7) to aid in combining the reactants. While the addition of such alkaline material is not required, it is preferred. A variety of bases can be used as the alkaline material such as are exemplified by tertiary amines, examples being trimethyl amine, triethyl amine, and pyridine; and metal alkoxides, such as potassium tertbutoxide. The preferred bases, however, are the alkali metal and alkaline earth metal bases, such as the carbonates, bicarbonates, hydroxides and oxides. Examples of particularly preferred bases include sodium carbonate, calcium carbonate, sodium hydroxide, potassium hydroxide, lithium bicarbonate, sodium bicarbonate, cesium carbonate, potassium carbonate, and ammonium carbonate. Only a small amount is used, generally less than 1.5% by weight of the final composition.

To prepare the plasticized compositions, the sulfur may be first melted and then such fillers, dyes and pigments as are desired can be added with the polysulfide. The order of addition is not critical, however, and the materials can be dry-mixed prior to heating. The preferred method of preparing the invention compositions is to heat the sulfur until in the molten state, i.e., from about 118° C. to about 250° C., and then react the molten sulfur with the polysulfide plasticizer.

A variety of fillers may be added to the compositions to include the sulfates, such as barium sulfate and calcium sulfate; silicas as exemplified by calcium silicate, magnesium silicate and silica; flours such as soyabean flour, tobacco flour, walnut shell flour and wood flour, and various clays, such as kaolin clay, bentonite clay, ball clay and fire clay.

Various whiteners or pigments may be blended with the compositions when a light color is desired, and one particularly effective pigment is titanium dioxide. Two excellent yellow pigments are Hansa yellow (the coupling product between diazotized p-nitroaniline and acetoacetanilide) and toluidine yellow (the coupling product between diazotized m-nitro-p-toluidine and acetoacetanilide).

In order to protect against bacterial attack that might result in deterioration and loss of bond to the pavement, a minor amount of a bactericide, such as o-benzyl-p-chlorophenol, pentachlorophenol, or sodium pentachlorophenate may be added to the melt but for most uses a bactericide is not required.

The sulfur composition is then applied in the molten state to the paved surface by an applicator of the type used for applying paint which has been adapted to permit maintaining the temperature of the composition at about 140° C. A stripe may easily be laid in any desired thickness and will set to harden in a fraction of the time required for traffic paints.

The following examples will serve to illustrate the invention; all parts and percentages in said examples are on a weight basis.

EXAMPLE 1

Seventy-nine parts of elemental sulfur in the molten state at a temperature of 135° C. is poured into a 250 cc. stainless steel beaker contained in a heating mantle. To this beaker are added 20 parts of bis-morpholine disulfide, 1 part of calcium carbonate, and the resultant melt is heated to 150° C. and maintained at this temperature for 30 minutes. The melt is poured into aluminum foil evaporating dishes, approximately 2" in diameter and ½" high, and allowed to cool to room temperature. The solid compositions are tested for impact resistance.

To test for impact resistance, two samples of the plasticized compositions are subjected to the Gardner light duty impact tester. This test consists of dropping a 1-pound ball on the sample from progressively higher heights until a cracking is noted on the reverse side of the sample. The two plasticized compositons are found to have an impact resistance of 16 inch-pounds. Two unplasticized sulfur compositions heated to 150° C. and maintained at that temperature for 30 minutes are also subjected to this test and found to have an impact resistance of less than 2 inch-pounds. Two polyethylene tetrasulfide plasticized compositions prepared by the method of this example were found to have an impact resistance of 4 inch-pounds.

EXAMPLE 2

Eighty-nine parts of elemental sulfur in the molten state at a temperature of 135° C. is poured into a 250 cc. stainless steel beaker contained in a heating mantle. To this beaker is added 10 parts of bis-morpholine disulfide, 1 part of calcium carbonate, and the melt is heated to 150° C. and maintained at this temperature for 30 minutes. The melt is poured into aluminum foil evaporating dishes, approximately 2" in diameter and ½" high, and allowed to cool to room temperature. The solid compositions are tested for impact strength and found to have an impact resistance of greater than 10 inch-pounds.

EXAMPLE 3

Ninety-four parts of elemental sulfur in the molten state at a temperature of 135° C. is poured into a 250 cc. stainless steel beaker contained in a heating mantle. To this beaker is added 5 parts of bis-morpholine disulfide, 1 part of calcium carbonate, and the melt is heated to 150° C. and maintained at this temperature for 30 minutes. The melt is poured into aluminum foil evaporating dishes, approximately 2" in diameter and ½" high, and allowed to cool to room temperature. The solid compositions are tested for impact strength and found to have an impact resistance of greater than 6 inch-pounds.

EXAMPLES 4–9

In accordance with the procedure of Example 1, sulfur compositions containing the reaction product of elemental sulfur and the following polysulfides are found to have impact resistances greater than 6 inch-pounds: diethyl amine disulfide, diisopropyl amine tetrasulfide, dicyclohexyl amine disulfide, diphenyl amine hexasulfide, bis-(piperidine) disulfide, and bis(tetrahydropyrrole) disulfide.

In many applications, compositions having impact resistance less than 6 inch-pounds are quite satisfactory. For road marking compositions and particularly for compositions to be used in heavily trafficked areas, however, it has been found that about 6 inch-pounds is the practical lower limit.

What is claimed is:

1. A plasticized sulfur composition having enhanced resistance to impact and suitable for marking roads, highways and other paved surfaces which comprises the reaction product of a polysulfide of the formula:

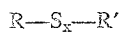

$$R-S_x-R'$$

wherein R and R' are secondary amines and $x$ is an integer of from 2 to 10 inclusive; and elemental sulfur in a ratio of polysulfide to sulfur of from about 1:99 to about 1:4.

2. A composition of claim 1 wherein the ratio of polysulfide to elemental sulfur is from about 5:95 to 1:4.

3. A composition of claim 1 wherein the polysulfide is bis-morpholine disulfide.

4. A composition of claim 2 wherein the polysulfide is bis-morpholine disulfide.

5. The composition of claim 2 wherein the polysulfide is bis-morpholine disulfide and the ratio of polysulfide to elemental sulfur is 1 to 4.

References Cited

UNITED STATES PATENTS

| | | | |
|---|---|---|---|
| 2,779,761 | 1/1957 | Kibler | 26—293.49 |
| 2,911,405 | 11/1959 | Gregg | 260—293.49 |
| 3,316,115 | 4/1967 | Barnes et al. | 106—287 |
| 3,342,620 | 9/1967 | Molinet et al. | 106—287 |

ALLAN LIEBERMAN, Primary Examiner

U.S. Cl. X.R.

260—244, 247.1, 239, 288, 307, 293.4, 326.12, 551, 563, 583